July 31, 1934.                    L. J. MOST                    1,968,567
                                FOUNTAIN PEN
                             Filed Sept. 9, 1933
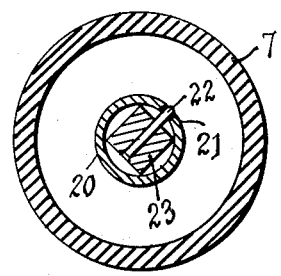
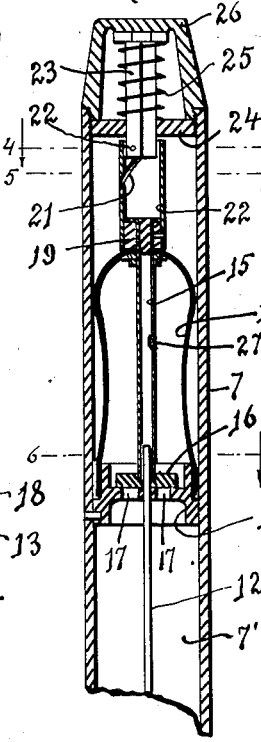
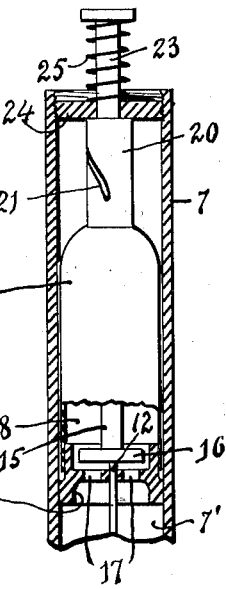
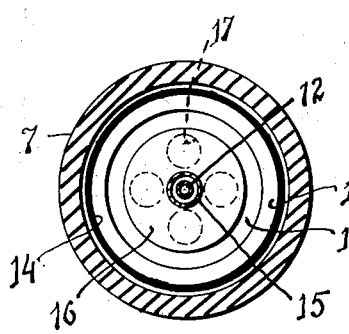
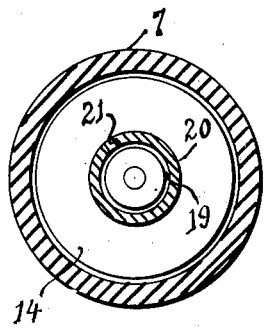
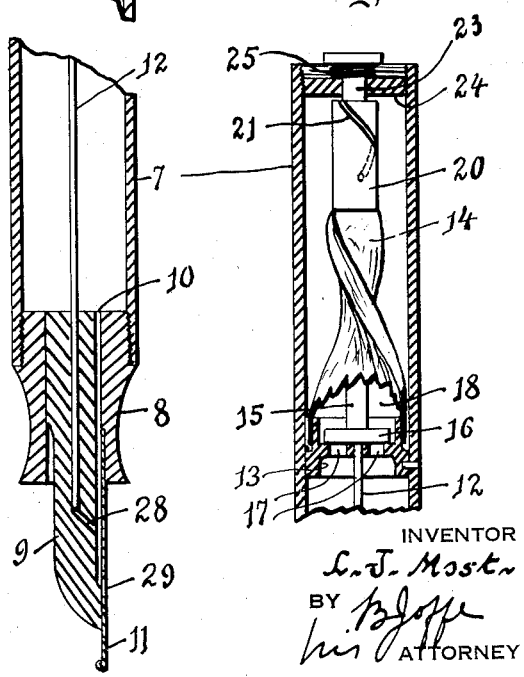
INVENTOR
L. J. Most
BY his ATTORNEY Patented July 31, 1934

1,968,567

UNITED STATES PATENT OFFICE 1,968,567

FOUNTAIN PEN

Lucifer J. Most, Kearny, N. J., assignor to Herbert L. Carman, Arlington, N. J.

Application September 9, 1933, Serial No. 688,708

15 Claims. (Cl. 120—46)

My invention relates to fountain pens of the self-filling type, having valve controlled communicating air and ink chambers.

An object of the invention is to provide a pen of the type referred to, which will require few operations to fill the barrel.

Another object of the invention is to provide a valve controlled communication between the portion of the barrel which is to contain ink and the means by which it is filled.

A further object of the invention is to reduce the tendency of bleeding of ink from the pen.

Other features of the invention will appear as the description proceeds.

In the appended drawing forming part of this application, Figure 1 is a vertical section through a pen embodying my invention.

Figure 2 is a similar fragmentary section through the pen with the cap removed.

Figure 3 is a similar section as Figure 2, showing the nipple collapsed when filling the pen.

Figure 4 is a cross-section on line 4—4, Figure 1.

Figure 5 is a similar section on line 5—5, Figure 1, and

Figure 6 is a cross-section on line 6—6, Figure 1.

Referring to the drawing, 7 is the barrel fitted with a holder 8 for a feed bar 9 positioned in it. The bar has an ink channel 10 leading from the barrel to the nib 11, secured between the bar 9 and the holder 8. A tube 12 rises from the feed bar 9 into the barrel 7 and extends through a nipple carrier 13, the feed bar and nipple carrier centering said tube 12 within the barrel. The nipple carrier 13 is secured to the barrel, and the space within the barrel between the feed holder and the nipple carrier defines the ink chamber 7' of the pen. A nipple 14, secured to the holder with its open end, extends within the barrel above the nipple holder 13.

A tubular stem 15, coaxial with the tube 12, is secured to the nipple 14 to move therewith, the open end of the stem at the nipple being sealed. The unsecured open end of the stem within the nipple carries a valve 16 adapted to participate in all the movements of the stem 15. The valve has a snug fit on the tube 12 entering through the valve into the stem 15. Said valve controls the openings 17 in the nipple holder 13 through which the air chamber 18 formed by the nipple 14 communicates with the ink chamber 7'.

The means 19 which secure the stem 15 to the nipple also secure thereto a tubular member 20 extending above the nipple and having a helical slot 21 engaged by a pin 22 provided within a stem 23 of angular cross-section, the stem in turn projecting through a plate 24 secured to the barrel, the portion of the stem above the plate being provided with a spring 25 normally tending to move the stem out of the plate. In view of the cross-section of the stem or plunger, the same is prevented from turning when reciprocated, but in view of its engagement with the helical slot 21, the member 20 is caused to turn or move angularly, thereby twisting and untwisting the rubber nipple 14, in consequence varying the volumetric content of the air chamber 18.

As will be seen from Figures 1 to 3 inclusive, the valve 16, tubular stem 15 and member 20 constitute a rigid unit adapted to move in unison. This unit's length being less than the distance from the plate 24 to the valve seat in the nipple holder, a longitudinal movement is provided for the unit in addition to the angular movement. This longitudinal movement of the unit controls the seating and unseating of said valve on its seat when the pen is to be filled or when a cap 26 is secured to the barrel 7 or removed therefrom. This cap is of such a length as to engage the angular stem 23 and move it downwardly a length sufficient to seat the valve against the resistance of spring 25, as shown in Figure 1. When the cap is removed, as shown in Figure 2, the spring 25 moves the plunger and so the nipple is permitted to straighten out as shown in Figure 2, and the valve 16 is removed from its seat, thus establishing communication between the air chamber 18 and the ink chamber 7'.

As the plunger 23 is moved against the resistance of the spring 25 from the position shown in Figure 2 to the position shown in Figure 3, the following takes place: The initial movement of the plunger displaces the valve 16 from the position shown in Figure 2 to that shown in Figure 1. There will be no turning movement of the tubular member 20, due to the fact that the pitch of the helical groove 21 is rather rapid, so that it is easier for the unit to move longitudinally while it is permitted before it turns, but as soon as the valve 16 engages the seat provided on the nipple holder 13, the vertical movement caused by the initial displacement of the plunger is arrested and the turning or angular movement then takes place as the plunger is forced from the position shown in Figures 1 and 2 to that shown in Figure 3.

In consequence of the turning movement of the unit, the nipple 14 is twisted as indicated in Figure 3, and the volumetric content thereof is altered.

In view of the fact that the valve closes the openings 17 which establish communication between the chambers 7' and 18, the air from chamber 18 can only find escape through an opening 27 provided in the tubular stem 15 within the nipple, then through the tube 12, passage 28 therefrom to ink channel 10. From this channel it can only pass out through the path of least resistance, that is, the nib's openings 29 positioned within an inkwell; the other direction leading into the chamber 7' being barred to the escaping air from the air chamber by the seating of the valve 16.

As pressure is released from the plunger 23, which is the actuator for the pen, the spring 25 forces it out of the plate 24. The initial movement of the returning stroke is to reciprocate the unit formed by the valve 16, tubular stem 15 and member 20, thus unseating the valve 16 before the untwisting of the nipple under the action of spring 25 and the restitutional force of the material of the nipple. This longitudinal movement takes place before the untwisting, due to the high pitch of the helical groove 21, as previously referred to.

Under the action of the spring 25 and the tendency of the nipple to return to its normal position, the unit with the nipple will move angularly and take the position as indicated in Figure 2. In consequence of this movement of the nipple, there is a reduction in pressure in the ink chamber 7' and ink will surge thereinto from the inkwell, through the nib opening 29, ink channel 10, the flow therethrough offering less resistance than through tube 12, because of the length of the tube as compared with the length of the channel.

If the valve 16 is not reseated after filling of chamber 7' with ink; that is, it is left in the position as shown in Figure 2, then naturally the air chamber 18 will be in communication with the ink chamber 7' through the opening 17, and since chamber 18 is in communication with the channel 10, the air above the ink will be subject to atmospheric conditions, and when the level of the ink within the chamber 7' is low, flooding may take place through the nib end of the pen. To prevent this, the valve 16 is seated on the nipple holder 13 to separate the air chamber 18 from the ink chamber 7', after the same has been filled, by causing the cap 26 to longitudinally displace the unit as previously referred to, thus accumulating in the ink chamber 7' only the air that infiltrates due to the use of ink through the nib.

I claim:

1. In a fountain pen, an air chamber, an ink chamber, means controlling the communication between said chambers, means for varying the volumetric contents of said air chamber and for positively operating said communication controlling means at the beginning of each variation.

2. In a fountain pen, an air chamber, an ink chamber, means controlling the communication between said chambers, and means adapted to move angularly for varying the volumetric contents of said air chamber, said latter means having a predetermined longitudinal movement for operating said communication controlling means.

3. In a fountain pen, an air chamber, an ink chamber, means controlling the communication between said chambers, means for varying the volumetric content of said air chamber, connected to said communication controlling means for operating said communication controlling means, at the initial operation of the increase or decrease of the volumetric contents of said air chamber.

4. In a fountain pen, an air chamber, an ink chamber, means controlling the communication between said chambers, and means adapted to move angularly for varying the volumetric content of said air chamber, said latter means having a predetermined longitudinal movement preceding the angular movement for operating said communication controlling means.

5. In a fountain pen, an air chamber, an ink chamber, a valve controlling the communication between said chambers, means for varying the capacity of said air chamber including means for operating positively said valve at the beginning of the increase or decrease of the volumetric content of said air chamber.

6. In a fountain pen, an air chamber, an ink chamber, a valve controlling the communication between said chambers, and means having an angular movement for varying the capacity of said air chamber, said means operating said valve before each angular movement thereof.

7. In a fountain pen, an air chamber, an ink chamber, a valve controlling the communication between said chambers, and means having an angular movement for varying the capacity of said air chamber, said means having a longitudinal movement preceding the angular movement for operating the valve.

8. In a fountain pen, a barrel having a feed, a tube in said barrel communicating with the feed, a nipple associated with the barrel and into which the tube leads, a valve controlled opening between the nipple and barrel, and means for collapsing the nipple including means for operating the valve independent of the nipple.

9. In a fountain pen, a barrel having a feed, a tube in said barrel communicating with the feed, a nipple associated with the barrel and into which the tube leads, a valve controlled opening between the nipple and barrel, and means having an angular movement for collapsing the nipple, said means having a predetermined longitudinal movement preceding the angular movement for operating the valve.

10. In a fountain pen, a barrel, a bar having a feed channel, a tube rising from said bar within the barrel, and communicating with the channel between the ends thereof, a nipple carrier secured within the barrel and into which said tube enters, a nipple on said carrier within the barrel and into which nipple the tube leads, valve controlled openings in the nipple holder, means for collapsing the nipple, including means to move the valve at the initial collapsing or restitution of the nipple.

11. In a fountain pen, a barrel, a bar having a feed channel, a tube rising from said bar within the barrel, and communicating with the channel between the ends thereof, a nipple carrier secured within the barrel and into which said tube enters, a nipple on said carrier within the barrel and into which nipple the tube leads, valve controlled openings in the nipple holder, means having an angular movement for collapsing the nipple, said means having also a longitudinal movement preceding the angular movement for operating the valve.

12. In a fountain pen, a barrel, a bar having a feed channel, a tube rising from said bar within the barrel and communicating with the channel between the ends thereof, a nipple carrier secured within the barrel and through which said tube projects, a nipple on said carrier and into which nipple the tube enters, a valve controlled opening in said nipple holder, a plunger mounted to slide into the barrel, means having a spiral slot extending from the nipple to engage the plunger, a stem connecting the valve to the nipple at the place where the means is connected thereto, said means and stem having an initial longitudinal displacement preceding an angular movement thereof when the plunger moves longitudinally and whereby said valve is operated at the beginning of the stroke of the plunger.

13. In a fountain pen having a nipple for filling the same, of means for operating said nipple comprising a spring actuated plunger mounted to reciprocate in the pen, a member coupling the nipple to the plunger adapted to move angularly when the plunger is reciprocated, whereby said nipple is collapsed.

14. In a fountain pen having a nipple for filling the same, of means for operating said nipple, comprising a plunger mounted to reciprocate in the pen, a member coupling the nipple to the plunger adapted to move angularly when the plunger is reciprocated, said member having an initial longitudinal movement preceding its angular movement when operated by said plunger, and a member carried within the nipple adapted to participate in the movement of said first member.

15. In a fountain pen, an air chamber, an ink chamber having a feed channel, a tube establishing communication between the air chamber and the channel, means controlling the communication between said chambers independent of said tube, and means for varying the volumetric contents of said air chamber and operating positively said communication controlling means at the beginning of each variation.

LUCIFER J. MOST.